United States Patent Office 3,751,465
Patented Aug. 7, 1973

3,751,465
PREPARATIONS OF N,N-DIALKYL-SUBSTITUTED FATTY AMIDES FROM NITRILES AND ALCOHOLS AND N,N-DIALKYLFORMAMIDES FROM HYDROGEN CYANIDE AND ALCOHOLS
Yasunobu Takahashi, Yohei Fukuoka, Katuyoshi Sasaki, and Saburo Senoo, Tokyo, Japan, assignors to Asahi Kassi Kogyo Kabushiki Kaisha, Kita-ku, Osaka, Japan
No Drawing. Continuation-in-part of abandoned application Ser. No. 748,165, July 29, 1968. This application Dec. 22, 1970, Ser. No. 100,837
Int. Cl. C07c 103/08
U.S. Cl. 260—561 R
9 Claims

ABSTRACT OF THE DISCLOSURE

Novel process for the preparation of N,N-dialkyl-substituted fatty amides represented by the general formula

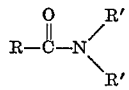

wherein R is an alkyl radical having 1 to 6 carbon atoms and R' is an alkyl radical having 1 to 4 carbon atoms, which comprises reacting at a temperature in the range of 50 to 1000° C. under pressure a nitrile represented by the general formula R—CN, wherein R has the same meaning as defined above, with an alcohol represented by the general formula R'—OH, wherein R' has the same meaning as defined above, the alcohol being employed in an amount in the range of from 1.5 to 10 moles of alcohol per mole of the nitrile, with or without employing a catalyst, and recycling at least a part of the by-products of the reaction to the starting reaction mixture. Thereby, the N,N-dialkylamides can be produced in high yield. And, a novel process for the preparation of N,N-dialkylformamides represented by the general formula

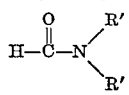

wherein R' is an alkyl radical having 1 to 4 carbon atoms, which comprises reacting at a temperature in the range of 50 to 1000° C. under pressure hydrogen cyanide, which is utterly different in chemical behavior from the nitrile, with an alcohol represented by the general formula R'—OH, wherein R' has the same meaning as defined above, the alcohol being employed in an amount in the range of from 1.5 to 10 moles of alcohol per mole of the hydrogen cyanide, with or without employing a catalyst. In the latter process also, the yield may advantageously be improved by recycling at least a part of the by-products of the reaction.

CROSS REFERENCE TO PRIOR APPLICATION

This is a continuation-in-part of our copending application Ser. No. 748,165, filed July 29, 1968, now abandoned.

This invention relates to the preparation of N,N-dialkylamides.

More particularly, this invention relates to a process for the preparation of N,N-dialkyl-substituted fatty amides, which comprises reacting a nitrile with an alcohol, and recycling at least a part of the by-products of the reaction to the starting reaction mixture, and relates also to a process for the preparation of N,N-dialkylformamides, which comprises reacting hydrogen cyanide with an alcohol.

N,N-dialkylamides are industrially important compounds which are useful as solvents for various purposes such as extraction and reaction media. Examples of these important N,N-dialkylamides include N,N-dimethylacetamide, N,N-dimethylformamide and N,N-diethylformamide. However, the conventional manufacturing processes for the preparation of N,N-dialkylamides are expensive, leading to a restriction on the use of the N,N-dialkylamides in industry.

Heretofore, it has been proposed to prepare N,N-dialkylamides by the reaction of a dialkylamine with one of several classes of compounds such as esters of fatty acids, fatty acids, primary amides of fatty acides and ketenes. It has also proposed to prepare N,N-dialkylamides by hydrolyzing a nitrile in the presence of an acid or alkali in an amount approximately equivalent to or greater than the amount of nitrile to produce the corresponding primary amide and/or acid, and subsequently reacting the resulting product with a dialkylamine to obtain the desired N,N-dialkylamide. Thus, it is without exception necessary to employ dialkylamines in the proposed processes for the preparation of N,N-dialklamides. Dialkylamines are produced by reacting an alcohol with ammonia under drastic conditions, that is under elevated temperature and at high pressure. The production of dialkylamines by such a process is inevitably accompanied by the formation of monoalkylamines and trialkylamines. The respective boiling points of these amines are close to one another, thus rendering difficult the separation and purification of mixtures of these amines. Therefore, the proposed methods for the preparation of N,N-dialkylamides, which require purified dialkylamines as starting material, are uneconomical.

It has now been found that N,N-dialkylamides can be prepared without employing dialkylamines as starting materials. According to the present invention, a nitrile and hydrogen cyanides respectively serve as sources of nitrogen for the N,N-dialkyl-substituted fatty amide and N,N-dialkylformamide, thereby eliminating the difficulties present in the proposed processes employing dialkylamines as a starting material.

In one aspect of the present invention, there is provided a process for the preparation of N,N-dialkylsubstituted fatty amides represented by the general formula

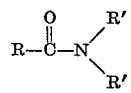

wherein R is an alkyl radical having 1 to 6 carbon atoms and R' is an alkyl radical having 1 to 4 carbon atoms, which comprises reacting at a temperature in the range of 50 to 1000° C. under pressure a nitrile represented by the general formula R—CN, wherein R has the same meaning as defined above, with an alcohol represented by the general formula R'—OH, wherein R' has the same meaning as defined above, the alcohol being employed in an amount in the range of from 1.5 to 10 moles of alcohol per mole of the nitrile, and recycling at least a part of the by-products of the reaction to the starting reaction mixture.

In this connection, it is noted that it has been reported to prepare N-alkyl-substituted fatty amides by reacting a nitrile with an alcohol at a temperature above 300° C. under pressure with employing a catalyst, which is accompanied by the formation of small amounts of N,N-dialkyl-substituted fatty amides and primary amides as by-products. However, the main product of the above-mentioned process is always an N-alkyl-substituted fatty amide and, therefore, this known process can not be commercailly utilized for the preparation of N,N-dialkyl-substituted fatty amides.

As a result of the intensive investigation by the present inventors to improve the process for the purpose of obtaining the N,N-dialkyl-substituted fatty amide in high yield, it has unexpectedly been found that by the addition or recycling of some or all of the by-products to the starting reaction mixture, the yield of the N,N-dialkyl-substituted fatty amide can be greatly improved. The instant process of the present invention has been made on the basis of such novel finding. Stated illustratively, the reaction mixture obtained by the reaction between a nitrile and an alcohol comprises various by-products including the corresponding primary amide, secondary amide, fatty acid, trialkylamine as well as small amounts of the fatty acid ester, monoalkylamine, dialkylamine and others in addition to the desired N,N-dialkyl-substituted fatty amide. The amounts of the nitrile and alcohol which remain unreacted are of only trace. By adding or recycling the by-products to the starting reaction system, the yield of the desired N,N-dialkyl-substituted fatty amide in relation to the amount of nitrile can advantageously be improved. In view of the significant difference in boiling point between the N,N-dialkyl-substituted fatty amides and the by-products, the isolation and purification of the desired N, N-dialkyl-substituted fatty amides can readily be accomplished. Moreover, it is to be noted that by further adding or recycling the by-products which are obtained in the first recycling stage to the reaction system of the succeeding time in the same manner as in the first recycling stage, the same effect can be obtained; and furthermore it is to be noted that this recycling operation can be repeated without restriction on the number of times to give the substantially constant effect every time. If the instant process of this invention is, as will be described later, carried out in the presence of a catalyst, the by-products recycled assist to increase the solubility of the catalyst, thereby remarkably improving the catalytic effect.

For exemplifying the effect of such recycling of the by-products, the illustration will be made on the reaction between acetonitrile and methanol. In this reaction, N,N-dimethylacetamide is obtained as a desired product, and, at the same time, a number of kinds of by-products are obtained. The desired product is obtained in poor selectivity as low as 40 to 50% in relation to the amount of acetonitrile employed. However, by adding or recycling the by-products to the starting reaction system, the yield of the desired product is improved up to higher than 90% in relation to the amount of acetonitrile employed. When the same operation as described is repeated further 8 times, the desired product is obtained in high yield every time as clearly shown in the following Table 1.

TABLE 1.—EFFECT OF RECYCLING

| Number of recycling stage | Acetonitrile charged, g. | By-products recycled, g. | Yield of N,N-dimethylacetamide G. | Percent |
|---|---|---|---|---|
|  | 140 | 165.4 | 86.5 | 28.3 |
| 1 | 41 | 163.8 | 82.7 | 95.0 |
| 2 | 41 | 163.8 | 79.9 | 92.0 |
| 3 | 41 | 159.2 | 79.6 | 91.5 |
| 4 | 41 | 160.1 | 80.9 | 93.0 |
| 5 | 41 | 151.1 | 84.2 | 97.0 |
| 6 | 41 | 151.3 | 79.0 | 91.1 |
| 7 | 41 | 149.4 | 80.5 | 92.6 |
| 8 | 41 | 146.1 | 82.0 | 94.5 |
| 9 | 41 | 141.6 | 81.0 | 93.1 |
| 10 | 41 | 141.5 | 83.5 | 96.2 |
|  | [1] 550 | [2] 141.5 | [3] 897 | [4] 76.9 |

[1] Total charge of acetonitrile.
[2] Final by-product.
[3] Total yield.
[4] Average percent.

The reason why the recycling operation has such favorable effect on the yield is not yet clear. But it is considered that the presence of the by-products in the reaction system might depress the formation of further by-products. In any event, it is surprising that in every recycling operation the formation of by-products is controlled to substantially the same level to give the desired product in high yield. Therefore, it is to be noted that, according to such surprising finding, it has first become possible to commercially produce N,N-dialkylamides from a nitrile and an alcohol.

One of the other advantages of the process of the present invention lies in the ready availability of the starting materials. For example, acetonitrile which is obtained as a by-product in the production of acrylonitrile by the ammonooxidation of propylene can advantageously be utilized as starting nitrile in the instant process of the present invention. Thus, by the reaction of such a nitrile with methanol or ethanol, the following useful N,N-dialkyl-substituted fatty amides may be readily produced: N,N-dimethylacetamide and N,N-diethylacetamide.

The nitriles which are employed in the process of this invention are suitably those of the general formula R—CN wherein R is an alkyl group having 1 to 6 carbon atoms. Examples of such nitriles are acetonitrile, n-propionitrile, sec-butyronitrile, tert-butyronitrile, valeronitrile and capronitrile. The alcohols used in the process of this invention are suitably those of the general formula R'—OH wherein R' is an alkyl group having 1 to 4 carbon atoms and examples of such alcohols are methyl alcohol, ethyl alcohol, n-propyl alcohol, isopropyl alcohol, n-butyl alcohol and isobutyl alcohol.

In carrying out the process of this invention, the starting materials, namely the nitrile and the alcohol may each be employed from the beginning of the reaction in the full amount required for the desired reaction, or may be successively or stepwise supplied during the course of the reaction. The alcohol is suitably employed in an amount ranging from 1.5 to 10 moles per mole of nitrile. When an insufficient amount of alcohol is employed the undersirable formation of N-monoalkylamides as by-product is promoted. The use of too much alcohol also has an adverse effect on the reaction, that is, the rate of reaction is depressed and, at the same time, the formation of trialkylamine as a by-product is unfavourably promoted.

Whilst the process of this invention may be carried out in the absence of a catalyst, the process is advantageously carried out in the presence of a catalyst. The use of a catalyst accelerates the rate of reaction and thus enables the process to be rapidly completed, and, at the same time, depresses the formation of by-product thereby improving the yield of the desired products. The catalysts for use in the process of the present invention may be selected from the following three groups:

(1) The metals copper, cadmium, mercury and tin;

(2) Oxides, oxyhalides, hydroxides, inorganic acid salts and organic acid salts of a metal selected from the group consisting of copper, silver, cadmium, mercury, titanium, zirconium, tin, lead, vanadium, antimony, bismuth, chromium, molybdenum, tungsten, manganese, cobalt, nickel, rhodium, palladium and platinum; and (3) Chromic acid, bichromic acid, molybdic acid, phosphomolybdic acid, tungstic acid and permanganic acid; alkali metal salts thereof.

Examples of particularly suitable inorganic acid salts of the metals of group (2) above are carbonates, cyanides, nitrates, sulphates, halides, phosphates, borates, nitrites, sulphites, phosphites and thiocyanates. Examples of suitable organic acid salts of the metals of group (2) above are formates, acetates, propionates, butyrates, stearates, oxalates, p-toluenesulfonates, naphthenates, and benzoates.

The catalyst may be employed in the form of a solution or suspension in the reaction system. The amount of the catalyst may vary widely, e.g. from 0.0001 to 10 mole percent, more preferably from 0.01 to 5 mole percent, based on the amount of nitrile. The use of a greatly increased amount of catalyst is not followed by a corresponding improvement in catalytic effect, but rather has a detrimental influence on the subsequent operations for isolating and purifying the desired product. On the other hand, it is undesirable to employ too small amount of a catalyst since no catalytic effect may be obtained.

The reaction according to the present invention can be effected in the gaseous or liquid phase. The reaction temperature employed is suitably from 50 to 1,000° C. In view of the fact that the lower the temperature, the slower the rate of reaction, whilst at too high temperatures an undue amount of by-product is formed, leading to a decreased yield of the desired N,N-dialkylamide, the preferred temperatures are from 100 to 500° C.

In another aspect of the present invention, there is provided a process for the preparation of N,N-dialkyl-formamides represented by the general formula

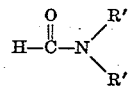

wherein R' is an alkyl radical having 1 to 4 carbon atoms, which comprises reacting at a temperature in the range of 50 to 1,000° C. under pressure hydrogen cyanide with an alcohol represented by the general formula R'—OH, wherein R' has the same meaning as defined above, the alcohol being employed in an amount in the range of from 1.5 to 10 moles per mole of the hydrogen cyanide.

In this connection, it is to be noted that although hydrogen cyanide is represented by the formula HCN which has a resemblance to the formula of a nitrile, it is utterly different in chemical behavior from a nitrile. For instance, a nitrile is reacted with an alcohol in the presence of a strong acid at a low temperature to produce an imino-ether as exemplified by the schema

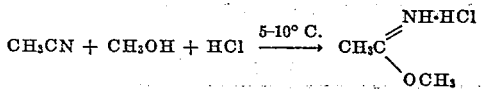

[Hamamoto et al., Nippon Kagaku Zasshi, 80, 226 (1959)], while hydrogen cyanide is reacted with an alcohol, for example, ethanol and hydrochloric acid to produce the mixture of ethyl chloride, ethyl formate,

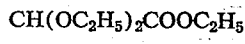

and $CH(OC_2H_5)_2CONH_2$ [Pinner, A, Ber. 16, 352–363 (1883)]. The above-mentioned reaction of hydrogen cyanide is deemed to be able to be shown by the following schemata:

$$HCN + C_2H_5OH + H_2O + HCl \rightarrow HCOOC_2H_5 + NH_4Cl$$

$$2HCN \rightarrow HC(:NH)CN$$

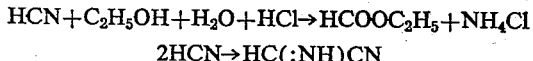
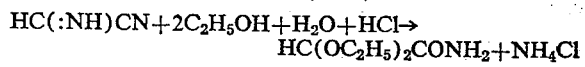

Therefore, it is apparent from the above discussion that whether or not the reactions that can proceed in case nitriles are employed are applicable to hydrogen cyanide can not be anticipated.

As a result of the study by the present inventors, however, it has surprisingly been found that hydrogen cyanide is reacted with an alcohol to give N,N-dialkylformamides. The present process of this invention was accomplished on the basis of such unexpected finding.

The present process can be carried out as a one-stage process, as opposed to the previously proposed process. Thus, a considerable simplification of the process as well as a reduction in the cost of the manufacture of N,N-dialkylformamides is achieved.

One of the other advantages of the present process of this invention lies in the ready availability of the starting materials. For example, hydrogen cyanide which is obtained as by-products in the production of acrylonitrile by the ammonoxidation of propylene can advantageously be utilized as starting material in the present process. Thus, by reaction of hydrogen cyanide with methanol or ethanol, the following useful N,N-dialkylformamides may be readily produced: N,N-dimethylformamide and N,N-diethylformamide.

With regard to the alcohols, the charging manner of the starting materials, the stoichiometric parameters, the catalyst, the temperature range and the recycling of the by-products, the same as employed in the aforementioned process comprising reacting a nitrile with an alcohol is applicable to this process in which hydrogen cyanide is reacted with an alcohol. Although the by-products recycling operation is not essential to the present process in which hydrogen cyanide is reacted with an alcohol, it has also a favorable effect on the yield of desired N,N-dialkyl-formamides. Stated illustratively, the reaction mixture obtained by the reaction between hydrogen cyanide and an alcohol comprises various by-products in addition to the desired N,N-dialkyl-formamide. Such by-products include relatively large amounts of formamide, a monoalkyl-formamide, a trialkylamine and a formic acid ester; small amounts of various polymers derived from hydrogen cyanide, polymers formed from hydrogen cyanide and the other by-products and polymers formed by the reaction between the other by-products; and traces of ammonia, formic acid, monoalkylamine, dialkylamine, and carboxylic acids and esters thereof that are products of the reaction in which an alkyl nitrile is firstly formed from the alkyl group of the alcohol and the cyano group of hydrogen cyanide and subsequently converted under the reaction condition. By adding or recycling to the starting reaction system, the yield of the desired N,N-dialkyl-formamide in relation to the amount of hydrogen cyanide can advantageously be improved. In view of the significant difference in boiling point between the N,N-dialkylform-amides and the by-products, the isolation and purification of the desired N,N-dialkylformamides can readily be accomplished. Moreover, it is to be noted that by further adding or recycling the by-products which are obtained in the first recycling stage to the reaction system of the succeeding time in the same manner as in the first recycling stage, the same effect can be obtained; and furthermore it is to be noted that this recycling operation can be repeated without restriction on the number of times to give the substantially constant effect every time. For exemplifying the effect of such recycling operation, the illustration will be made on the reaction between hydrogen cyanide and methanol. In this reaction, N,N-dimethylformamide is obtained as a desired product and, at the same time, a number of kinds of by-products are obtained. The desired product is obtained in poor yield as low as about 25% in relation to the amount of hydrogen cyanide employed. However, by adding or recycling the by-products to the starting reaction system, the yield of the desired product is improved higher than 60% in relation to the amount of hydrogen cyanide employed. When the same operation as described is repeated further 8 times, the desired product is obtained in high yield every time as clearly shown in the following Table 2.

TABLE 2.—EFFECT OF RECYCLING

| Number of recycling stage | Hydrogen charged cyanide g. | By-products recycled, g. | Yield of N,N-dimethyl-formamide | |
|---|---|---|---|---|
| | | | G. | Percent |
| | 67.5 | | | |
| 1 | 27 | 141.3 | 45.7 | 24.9 |
| 2 | 27 | 149.4 | 47.8 | 65.6 |
| 3 | 27 | 168.1 | 45.5 | 62.3 |
| 4 | 27 | 180.3 | 49.1 | 67.3 |
| 5 | 27 | 190.1 | 44.9 | 61.5 |
| 6 | 27 | 211.5 | 50.5 | 69.2 |
| 7 | 27 | 224.9 | 48.5 | 66.4 |
| 8 | 27 | 234.0 | 46.9 | 64.3 |
| 9 | 27 | 245.8 | 50.5 | 69.2 |
| 10 | 27 | 256.2 | 50.5 | 68.5 |
| | | 267.9 | 46.9 | 64.2 |
| | [1] 337.5 | [2] 267.9 | [3] 526.3 | [4] 57.7 |

[1] Total charge of hydrogen cyanide.
[2] Final by-product.
[3] Total yield.
[4] Average percent.

As described, according to the present invention, there is provided a process for the preparation of N,N-dialkylamides which is simple to carry out as opposed to the conventional process employing dialkylamines which are difficult to obtain in the purified form. In addition, by recycling the by-products, the N,N-dialkylamides can be prepared in high yield. Thus, the present manufacturing process for the preparation of N,N-dialkylamides are extremely valuable in the industry.

The following examples are given by way of illustration of the invention.

EXAMPLE 1

41 g. of acetonitrile, 68 g. of methanol and 1.5 g. of zinc chloride were charged into an induction revolving stirring type autoclave (hereinafter referred to as an autoclave) having a capacity of 200 ml. and, after replacement of the air in the autoclave by nitrogen, were heated to react at 350° C. for 1 hour, resulting in 32.5 g. (37.4%) of N,N-dimethylacetamide. There were also produced, as a by-product, 28.2 g. of N-methylacetamide having a boiling point of 140° C./90 mm. Hg. Absorption due to an amido group was observed at $\nu$max., 1640 cm.$^{-1}$ in the infrared absorption spectrum. To the N-methylacetamide thus obtained were added 41 g. of acetonitrile, 68 g. of methanol and 1.5 g. of zinc chloride, whereupon the mixture was heated at 350° C. for 1 hour to yield 52.9 (64%) of N,N-dimethylacetamide together with 38.5 g. of N-methylacetamide as by-product.

EXAMPLE 2

41 g. of acetonitrile, 71 g. of methanol and 3.5 g. of cobalt chloride were charged into an autoclave having a capacity of 500 ml. The air in the autoclave was replaced by nitrogen. Reaction at 380° C. for 20 minutes gave 35.1 g. of N,N-dimethylacetamide. The by-products formed were 27.5 g. of N-methylacetamide, 3.0 g. of acetamide, 9.0 g. of acetic acid, 0.2 g. of methyl acetate, 0.3 g. of ammonia, 0.2 g. of monomethylamine, 0.2 g. of dimethylamine and 12 g. of trimethylamine. These by-products were mixed with 41 g. of acetonitrile, 71 g. of methanol and 3.5 g. of cobalt chloride and the mixture was reacted at 380° C. for 20 minutes to give 60.9 g. of N,N-dimethylacetamide (Yield in relation to the charged acetonitrile: 70.1%) and the by-products including 50.3 g. of monomethylacetamide, 3.5 g. of acetamide, 7.8 g. of acetic acid, 0.4 g. of methyl acetate, 0.4 g. of ammonia, 0.2 g. of monomethylamine, 0.2 g. of dimethylamine and 18.2 g. of trimethylamine. The second by-products thus formed were mixed with 41 g. of acetonitrile, 71 g. of methanol and 3.5 g. of cobalt chloride and the mixture was reacted at 380° C. for 20 minutes to give 75.6 g. of N,N-dimethylacetamide (Yield in relation to the charged acetonitrile: 97.0%) and the by-products including 54.8 g. of N-methylacetamide, 5.0 g. of acetamide, 8.2 g. of acetic acid and 0.5 g. of methyl acetate.

EXAMPLE 3

41 g. of acetonitrile, 55 g. of methanol and 5.1 g. of zinc iodide were charged into an autoclave having a capacity of 300 ml. After replacement of the air in the autoclave by nitrogen, the mixture was heated at 320° C. for 3 hours to yield 29.5 g. of N,N-dimethylacetamide. The by-products obtained comprised 35.1 g. of N-methylacetamide, 2.0 g. of acetamide, 3.1 g. of acetic acid, 0.1 g. of methyl acetate, 0.2 g. of ammonia, 0.2 g. of monomethylamine, 0.1 g. of dimethylamine and 2.8 g. of trimethylamine. To the by-products thus obtained were added 20.5 g. of acetonitrile, 28 g. of methanol, 2.5 g. of zinc iodide, and the mixture was heated to react at 320° C. for 3 hours, resulting in 37 g. of N,N-dimethylacetamide.

EXAMPLE 4

140 g. (3.4 moles) of acetonitrile, 147 g. (4.6 moles) of methanol and 12 g. of cobalt chloride were charged into an autoclave having a capacity of 500 ml. and, after replacement of the air in the autoclave by nitrogen, were heated to react at 350° C. for 1 hour. After completion of the reaction, the reaction mixture was cooled. On opening the autoclave, the reaction mixture was subjected to distillation to give the following fractions.

TABLE 3

| Fraction: | Boiling point | Yield, g. |
|---|---|---|
| $F_1$ | Up to 99° C./760 mm. Hg | 1.2 |
| $F_2$ | 99 to 100° C./760 mm. Hg | 15.0 |
| $F_3$ | 85 to 89° C./33 mm. Hg | 91.5 |
| $F_4$ | 90° C./30 mm. Hg / 120° C./10 mm. Hg | 145.6 |
| In a trap (cooled at −70° C.) | | 18.6 |

The main component of the fraction $F_3$ was N,N-dimethylacetamide. The N,N-dimethylacetamide content of the fraction $F_3$ was 94.5% (Yield in relation to the charged acetonitrile: 28.3%).

The fractions $F_1$ and $F_4$ and a fraction in the trap were mixed. To the mixture were added 41.0 g. of acetonitrile, 64.0 g. of methanol and 12 g. of cobalt chloride, whereupon, in the same manner as described above, the reaction was allowed to proceed and then the distillation was effected to give the following fractions.

TABLE 4

| Fraction: | Boiling point | Yield, g. |
|---|---|---|
| $F'_1$ | Up to 98° C./760 mm. Hg | 1.2 |
| $F'_2$ | 98 to 100° C./760 mm. Hg | 14.0 |
| $F'_3$ | 84 to 88° C./30 mm. Hg | 90.6 |
| $F'_4$ | 90° C./30 mm. Hg / 120° C./10 mm. Hg | 140.1 |
| In a trap (cooled at −70° C.) | | 22.5 |

The main component of the fraction $F'_3$ was N,N-dimethylacetamide. The N,N-dimethylacetamide content of the fraction $F'_3$ was 91.3% (Yield in relation to the charged acetonitrile: 95.0%).

The fractions $F'_1$ and $F'_4$ and a fraction in the trap were mixed. To the mixture were added 41.0 g. of acetonitrile, 64.0 g. of methanol and 12.0 g. of cobalt chloride, whereupon, in the same manner as described above, the reaction was allowed to proceed and then the distillation was effected to give the following fractions.

TABLE 5

| Fraction: | Boiling point | Yield, g. |
|---|---|---|
| $F''_1$ | Up to 98° C./760 mm. Hg | 0.3 |
| $F''_2$ | 98 to 100° C./760 mm. Hg | 10.0 |
| $F''_3$ | 84 to 88° C./35 mm. Hg | 89.2 |
| $F''_4$ | 90° C./30 mm. Hg / 120° C./10 mm. Hg | 142.5 |
| In a trap (cooled at −70° C.) | | 21.1 |

The main component of the fraction $F''_3$ was N,N-dimethylacetamide. The N,N-dimethylacetamide content of the fraction $F''_3$ was 89.6% (Yield in relation to the charged acetonitrile was 92%).

The same recycling operation as described was repeated further 8 times. The results are summarized in the following Table 6. As shown in Table 6, the yield of N,N-dimethylacetamide obtained in the final recycling operation was 96.2% (in relation to the charged acetonitrile), and there were 141.5 g. of the by-products in the final recycling operation.

TABLE 6

| Number of recycling stage | Acetonitrile charged, g. | By-products recycled, g. (F₁ plus F₄ plus trap) | Yield of N,N-dimethylacetamide | |
|---|---|---|---|---|
| | | | G. | Percent |
| | 140 | 165.4 | 86.5 | 28.3 |
| 1 | 41 | 163.8 | 82.7 | 95.0 |
| 2 | 41 | 163.8 | 79.9 | 92.0 |
| 3 | 41 | 159.2 | 79.6 | 91.5 |
| 4 | 41 | 160.1 | 80.9 | 93.0 |
| 5 | 41 | 151.1 | 84.2 | 97.0 |
| 6 | 41 | 151.3 | 79.0 | 91.1 |
| 7 | 41 | 149.4 | 80.5 | 92.6 |
| 8 | 41 | 146.1 | 82.0 | 94.5 |
| 9 | 41 | 141.6 | 81.0 | 93.1 |
| 10 | 41 | 141.5 | 83.5 | 96.2 |
| | ¹ 550 | ² 141.5 | ³ 897 | ⁴ 76.9 |

¹ Total charge of acetonitrile.
² Final by-product.
³ Total yield.
⁴ Average percent.

Whilst, the following comparative experiment was conducted. The same operation as described in the instant Example 4 was effected except that 550 g. of acetonitrile, 787 g. of methanol and 132 g. of cobalt chloride were employed, and the recycling operation is omitted. There were obtained N,N-dimethylacetamide in a poor yield of 381 g. (33%). There were also obtained 995 g. of the by-products.

EXAMPLE 5

41.0 g. (1.0 mole) of acetonitrile, 64.0 g. (2.0 moles) of methanol and 12.0 g. of cupric chloride were charged into an autoclave having a capacity of 500 ml. and, after replacement of the air in the autoclave by nitrogen, were heated to react at 280° C. for 2 hours. On opening the autoclave, the reaction mixture was subjected to distillation to give the following fractions.

TABLE 7

| | Boiling point | Yield, g. |
|---|---|---|
| Fraction: | | |
| F₁ | Up to 98° C./760 mm. Hg | 3.0 |
| F₂ | 98 to 101° C./760 mm. Hg | 16.0 |
| F₃ | 83 to 89° C./33 mm. Hg | 40.8 |
| F₄ | 90° C./30 mm. Hg  — 120° C./10 mm. Hg | 36.4 |
| In a trap (cooled at −70° C.) | | 5.8 |

The main component of the fraction F₃ was N,N-dimethylacetamide. The N,N-dimethylacetamide content of the fraction F₃ was 85.3% and its yield was 34.8 g. (Yield in relation to the charged acetonitrile was 40.0%). To 3.0 g. of the fraction F₁ of table 7 were added 41.0 g. of acetonitrile, 64.0 g. of methanol and 12.0 g. of cupric chloride, whereupon, in the same manner as described above, the reaction was allowed to proceed and then the distillation was effected to obtain 36.7 g. of N,N-dimethylacetamide (Yield in relation to the charged acetonitrile: 42.2%). The yield in relation to the charged acetonitrile increased by 2.2% by recycling the fraction F₁.

EXAMPLE 6

To 36.4 g. of the fraction F₄ shown in Table 7 of Example 5 were added 41.0 g. of acetonitrile, 64.0 g. of methanol and 12.0 g. of cupric chloride, whereupon, in the same manner as described in Example 5, the reaction was allowed to proceed and then the distillation was effected to obtain 64.0 g. of N,N-dimethylacetamide (Yield in relation to the charged acetonitrile: 75.3%). The yield in relation to the charged acetonitrile increased by 35.3% by recycling the fraction F₄.

EXAMPLE 7

To 5.8 g. of the fraction in the trap shown in Table 7 of Example 5 were added 41.0 g. of acetonitrile, 64.0 g. of methanol and 12.0 g. of cupric chloride, whereupon, in the same manner as described in Example 5, the reaction was allowed to proceed and the distillation was effected to obtain 38.1 g. of N,N-dimethylacetamide (Yield in relation to the charged acetonitrile: 43.8%). Recycling of the fraction in trap increased the yield in relation to the charged acetonitrile by 3.8%.

EXAMPLE 8

82.0 g. (2.0 moles) of acetonitrile, 128.0 g. (4.0 moles) of methanol and 20 g. of manganese naphthenate (total charged amount: 230.0 g.) were charged into an autoclave having a capacity of 500 ml., and heated with stirring to react at 300° C. for 2 hours. On opening the autoclave, the reaction mixture was subjected to distillation to give the following fractions.

TABLE 8

| | Boiling point | Yield, g. |
|---|---|---|
| Fraction: | | |
| F₁ | Up to 98° C./760 mm. Hg | 2.0 |
| F₂ | 98 to 101° C./760 mm. Hg | 32.0 |
| F₃ | 83 to 89° C./31 mm. Hg | 87.1 |
| F₄ | 89° C./30 mm. Hg  — 123° C./10 mm. Hg | 72.1 |
| In a trap (cooled at −70° C.) | | 13.5 |

The main component of the fraction F₃ was N,N-dimethylacetamide. The result of the analysis of the F₃ showed the yield of N,N-dimethylacetamide was 82.1 g. (Yield in relation to the charged acetonitrile: 47.2%).

The fractions F₁ and F₄ and the fraction in a trap were mixed (total amount: 87.6 g.). To the resulting mixture were added 41.0 g. (1.0 mole), 64.0 g. (2.0 moles) of methanol (total amount of the acetonitrile and the methanol: 105.0 g.) and 20 g. of manganese naphthenate (total amount of charge: 212.6 g.), whereupon, in the same manner as described above, the reaction was allowed to proceed and then the distillation was effected to give 85.1 g. of N,N-dimethylacetamide (Yield in relation to the charged acetonitrile: 97.2%). As compared with the first reaction in which 2 moles of acetonitrile were employed (total amount of charge: 230 g.), both the yield in relation to the charged acetonitrile and the absolute yield increased in spite of less total amount of charge (212.6 g.) in the second reaction in which by-product fractions were recycled.

EXAMPLE 9

41.0 g. (1.0 mole) of acetonitrile, 64.0 g. (2.0 moles) of methanol and 15 g. of bismuth nitrate were charged into an autoclave having a capacity of 200 ml., and heated with stirring to react at 320° C. for 2 hours. The thus obtained reaction mixture was subjected to distillation to give the following fractions.

TABLE 9

| | Boiling point | Yield, g. |
|---|---|---|
| Fraction: | | |
| F₁ | Up to 98° C./760 mm. Hg | 3.0 |
| F₂ | 98 to 100° C./760 mm. Hg | 16.5 |
| F₃ | 83 to 90° C./33 mm. Hg | 43.5 |
| F₄ | 90° C./30 mm. Hg  — 125° C./10 mm. Hg | 35.1 |
| In a trap (cooled at −70° C.) | | 6.1 |

The main component of the fraction F₃ was N,N-dimethylacetamide. The N,N-dimethylacetamide content of the fraction F₃ was 84.5% (Yield in relation to the charged acetonitrile: 42.2%).

The fractions F₁, F₄ and the fraction in the trap shown in Table 9 were mixed (total amount: 44.2 g.). To 4.4 g. of the resulting mixture, 4.1 g. (0.1 mole) of acetonitrile and 1.5 g. of bismuth nitrate was added methanol in an amount as shown in Table 10, whereupon, in the same manner as described above, the reaction was allowed to proceed at 320° C. in an autoclave. The yields of the thus obtained N,N-dimethylacetamide are shown in Table 10.

TABLE 10

| Experiment number | Amount of methanol [1] | Yield (percent) |
|---|---|---|
| 1 | 1.2 | 25.2 |
| 2 | 1.5 | 55.2 |
| 3 | 2.0 | 71.1 |
| 4 | 4.0 | 70.5 |
| 5 | 10.0 | 44.1 |
| 6 | 20.0 | 14.1 |

[1] Expressed in mole in relation to the amount of acetonitrile.

EXAMPLE 10

In the same manner as described in Example 5, to 41.0 g. (1.0 mole) of acetonitrile and 64.0 g. (2.0 moles) of methanol were added a catalyst as shown in Table 11 in an amount of 5 mole percent in relation to the amount of acetonitrile. Reaction at 340° C. for 2 hours followed by distillation gave fractions of the kinds as shown in Table 7. The fractions $F_1$ and $F_4$ and the fraction in a trap were mixed. To the resulting mixture were added 41.0 g. of acetonitrile, 64.0 g. of methanol and a catalyst as shown in Table 11 in an amount of 5 mole percent in relation to the amount of acetonitrile, whereupon, in the same manner as described above, the reaction was allowed to proceed to give N,N-dimethylacetamide with the yields as shown in Table 11. The yields in the first reaction before recycling are also shown in Table 11.

TABLE 11

| Catalyst | Yield, g. First reaction | Yield, g. Second reaction (after recycling) |
|---|---|---|
| Cuprous chloride | 35.2 | 69.2 |
| Cupric thiocyanate | 22.5 | 60.3 |
| Silver nitrate | 12.4 | 52.2 |
| Chloroplatinic acid | 21.1 | 62.1 |
| Titanium dioxide | 21.6 | 60.3 |
| Zirconium oxychloride | 24.2 | 60.6 |
| Stannous nitrite | 22.9 | 61.3 |
| Stannic nitrite | 25.6 | 63.2 |
| Lead phosphate | 12.8 | 51.1 |
| Antimony chloride | 24.0 | 56.6 |
| Bismuth chloride | 30.3 | 62.1 |
| Chromium chloride | 31.5 | 60.9 |
| Molybdic acid | 16.2 | 52.3 |
| Tungstic acid | 10.3 | 42.5 |
| Manganese chloride | 31.5 | 66.5 |
| Ferric chloride | 38.8 | 69.1 |
| Cobalt chloride | 32.5 | 71.1 |
| Nickel chloride | 26.5 | 62.3 |
| Rhodium chloride | 21.1 | 52.1 |
| Palladium chloride | 19.8 | 55.3 |
| Iridium chloride | 20.1 | 59.3 |
| Platinum chloride | 19.3 | 65.1 |
| Titanium trichloride | 32.5 | 52.3 |
| Titanium tetrachloride | 35.5 | 66.5 |
| Titanium hydroxide | 28.3 | 51.2 |
| Titanium sulfate | 26.5 | 56.5 |
| Titanium oxalate | 25.2 | 52.1 |
| Cobalt hydroxide | 29.3 | 50.3 |
| Cobalt carbonate | 16.2 | 45.7 |
| Cobalt cyanide | 17.1 | 40.6 |
| Cobalt borate | 25.1 | 53.4 |
| Cobalt formate | 32.8 | 59.9 |
| Cobalt oxalate | 31.5 | 56.7 |
| Cobalt benzoate | 28.7 | 58.3 |
| Ferric oxide | 25.3 | 62.5 |
| Ferric cyanide | 26.5 | 63.3 |
| Ferrous nitrate | 21.2 | 60.5 |
| Ferric nitrate | 31.1 | 62.5 |
| Ferrous sulfate | 28.8 | 60.5 |
| Ferric acetate | 26.3 | 62.3 |
| Nickel sulfate | 26.1 | 64.5 |
| Nickel hydroxide | 29.3 | 64.3 |
| Nickel oxalate | 26.2 | 61.1 |
| Nickel phosphate | 32.1 | 64.5 |
| Nickel thiocyanate | 36.3 | 64.9 |
| Rhodium nitrate | 22.4 | 57.1 |
| Rhodium sulfate | 19.5 | 59.3 |
| Palladium nitrate | 18.2 | 54.1 |
| Palladium sulfate | 21.5 | 45.7 |
| Platinic iodide | 26.3 | 51.5 |
| Platinic sulfate | 21.1 | 53.3 |
| Platinous cyanide | 21.7 | 54.4 |

EXAMPLE 11

To 41.0 g. (1.0 mole) of acetonitrile and 64.0 g. (2.0 moles) of methanol was added a catalyst as shown in Table 12, in the same manner as described in Example 5. Reaction was effected at 450° C. for 30 minutes. The thus obtained reaction mixture was distilled to give fractions of the kinds as shown in Table 4. The fractions of $F_1$ and $F_4$ and the fraction in a trap were mixed. To the resulting mixture were added 41.0 g. of acetonitrile, 64.0 g. of methanol and the catalyst mentioned above and heated in the same manner as mentioned above to give N,N-dimethylacetamide with the yields as shown in Table 12.

TABLE 12

| Catalyst: | Yield, g. |
|---|---|
| Cupric sulfite | 45.3 |
| Cupric phosphite | 47.2 |
| Zinc phosphate | 41.2 |
| Zinc phosphite | 49.3 |
| Zinc cyanate | 42.4 |
| Zinc borate | 55.2 |
| Zinc formate | 46.3 |
| Zinc oxalate | 40.5 |
| Stannic naphthenate | 38.7 |
| Stannic borate | 45.0 |
| Stannic thiocyanate | 50.1 |
| Stannous propionate | 42.2 |
| Stannous stearate | 40.1 |
| Stannous p-toluenesulfonate | 42.3 |
| Cobalt naphthenate | 47.2 |
| Antimony oxychloride | 46.1 |
| Antimony pentoxide | 41.0 |
| Cobalt butyrate | 51.8 |
| Lead nitrate | 43.8 |
| Copper (powder) | 36.1 |
| Cupric carbonate | 34.2 |
| Zinc | 40.7 |
| Cadmium | 35.3 |
| Mercury | 37.6 |
| Cadmium carbonate | 42.3 |
| Cadmium hydroxide | 45.2 |

EXAMPLE 12

In the same manner as mentioned in Example 5, to 41.0 g. (1.0 mole) of acetonitrile and 60.0 g. (2.0 moles) of methanol was added a mixture of catalysts as shown in Table 13. Reaction was effected at 340° C. for 2 hours and then distillation was performed to give fractions $F_1$ and $F_4$ and the fraction in a trap. To the mixture of the above-mentioned fractions were added 41.0 g. of acetonitrile, 60.0 g. of methanol and the catalysts mentioned above and heated in the same manner as mentioned above to give N,N-dimethylacetamide with the yields as shown in Table 13.

TABLE 13

| Catalyst | Amount of catalyst [1] | Yield, g. |
|---|---|---|
| Cadmium acetate | 1.5 | 51.2 |
| Mercuric acetate | 1.5 | |
| Cadmium benzoate | 2.0 | 48.1 |
| Vanadium pentoxide | 1.0 | |
| Mercuric formate | 2.0 | 55.6 |
| Zirconium oxide | 1.0 | |
| Bismuth oxychloride | 1.0 | |
| Cadmium propionate | 2.5 | 40.5 |
| Manganese sulfite | 1.5 | |
| Silver sulfite | 1.0 | |
| Mercurous stearate | 1.0 | 43.2 |
| Manganese borate | 1.0 | |
| Molybdenum trioxide | 1.0 | |
| Tungsten hexachloride | 1.0 | |
| Mercuric benzoate | 1.5 | 51.3 |
| Zirconium sulfate | 1.0 | |
| Vanadium oxychloride | 1.5 | |
| Chromium carbonate (basic) | 1.0 | |
| Chromium naphthenate | 1.0 | 47.7 |
| Bismuth oxalate | 1.0 | |
| Chromium formate | 1.0 | |
| Silver cyanide | 1.0 | |

[1] Expressed in mole percent in relation to the amount of acetonitrile.

EXAMPLE 13

In the same manner as described in Example 5, 41.0 g. (1.0 mole) of acetonitrile, 64.0 g. (2.0 moles) of methanol and 15 g. of antimony trichloride were charged in an autoclave and heated to react at 320° C. for 1 hour. The thus obtained reaction mixture was distilled to give fractions of the kinds as shown in Table 7. The yields of fractions $F_1$ and $F_4$ and the fraction in a trap were totalled 46.2 g. 22.5 g. of the mixture of the above-mentioned fractions, 20.5 g. (0.5 mole) of acetonitrile, 32.0 g. (1.0 mole) of methanol and 7.5 g. of antimony trichloride were charged in an autoclave and heated to react at 150° C. for 10 days to give 21.0 g. of N,N-dimethylacetamide.

EXAMPLE 14

22.5 g. of the fraction mixture obtained in Example 12, 20.5 g. (0.5 mole) of acetonitrile, 32.0 g. (1.0 mole) of methanol and 10.0 g. of tin were charged in an autoclave and heated to react at 500° C. for 10 minutes to give 31.1 g. of N,N-dimethylacetamide.

EXAMPLE 15

41.0 g. of acetonitrile, 148.0 g. of n-butyl alcohol and 5.2 g. of zinc p-toluenesulfonate were charged in an autoclave and heated to react at 360° C. for 4 hours to give 45.0 g. of N,N-di-n-butylacetamide (boiling point: 115 to 116° C./9 mm. Hg). Further distillation gave 85.0 g. of a substance having a high boiling point (boiling point: 117° C./8 mm. Hg to 150° C./5 mm. Hg). 85.0 g. of the substance having a high boiling point, 41.0 g. of acetonitrile, 148.0 g. of n-butyl alcohol and 5.2 g. of zinc p-toluenesulfonate were charged into an autoclave and heated to react at 360° C. for 4 hours to give 69.0 g. of N,N-di-n-butylacetamide.

EXAMPLE 16

8.5 g. of n-capronitrile, 6.5 g. of methanol and 0.5 g. of ferric formate were charged into an autoclave and heated to react at 350° C. for 30 minutes to give 5.3 g. of N,N-dimethyl-n-capronamide. 4.5 g. of by-product having a boiling point higher than N,N-dimethyl-n-capronamide were obtained. 4.5 g. of the by-product thus obtained, 8.5 g. of n-capronitrile, 6.5 g. of methanol and 0.5 g. of ferric formate were charged into an autoclave and heated to react at 350° C. for 30 minutes to give 8.2 g. of N,N-dimethyl-n-capronamide.

EXAMPLE 17

6.9 g. of isopropionitrile, 7.1 g. of methanol and 0.3 g. of zinc butyrate were charged into an autoclave and heated to react at 330° C. for 2 hours to give 4.5 g. of N,N-dimethylisopropionamide.

5.3 g. of a by-product having a boiling point higher than N,N-dimethylpropionamide were obtained. 5.3 g. of the by-product were added to 6.9 g. of isopropionitrile, 7.1 g. of methanol and 0.3 g. of zinc butyrate in an autoclave and heated to react at 350° C. for 30 minutes to give 7.5 g. of N,N-dimethylisopropionamide.

EXAMPLE 18

An autoclave having a capacity of 500 ml. was charged with 54 g. of hydrogen cyanide and 192 g. of methanol, which, after replacement of the air in the autoclave by nitrogen, were heated at 280° C. for 48 hours. Upon opening the autoclave, the portions having lower boiling points were distilled off under normal pressure. The remaining portion was further distilled to yield 1.2 g. of N,N-dimethylformamide as a fraction boiling at 152 to 153° C. under normal pressure. Its infrared absorption spectrum exhibited an absorption due to an amido group at ν max., 1640 cm.$^{-1}$.

Elementary analysis.—Found (percent): C, 40.21; H, 9.20; N, 18.90. Calcd. (percent): C, 40.30; H, 9.65; N, 19.17.

EXAMPLE 19

2.7 g. of hydrogen cyanide and 7.0 g. of methanol were charged into an autoclave having a capacity of 20 ml. together with the catalyst listed in the following Table I in an amount of 5 mole percent based on the amount of hydrogen cyanide.

The mixture was allowed to react at 240° C. for 2 hours. The yields of N,N-dimethylformamide are listed in the following Table 14 together with the catalyst employed.

TABLE 14

| Catalyst | Yield G. | Percent |
|---|---|---|
| Cupric chloride | 1.5 | 20.6 |
| Zinc bromide | 2.3 | 31.5 |
| Ferric chloride | 2.2 | 30.2 |
| Cobalt chloride | 2.5 | 34.3 |
| Cobalt naphthenate | 2.0 | 27.4 |
| Cobalt tolilate | 1.8 | 24.7 |
| Cobalt picrate | 1.0 | 13.7 |

EXAMPLE 20

67.5 g. (2.5 moles) of hydrogen cyanide, 147 g. (4.6 moles) of methanol and 25.0 g. of zirconium oxychloride were charged into an autoclave and, after replacement of the air in the autoclave by nitrogen, were heated to react at 250° C. for 1 hour. After completion of the reaction mixture was subjected to distillation to give the following autoclave, hydrogen cyanide was not detected and the reaction mixture was subjected to distillation to give the following fraction.

TABLE 15

| Fraction | Boiling point | Yield, g. |
|---|---|---|
| $F_1$ | 20 to 90° C./760 mm. Hg | 17.7 |
| $F_2$ | 72 to 78° C./40 mm. Hg | 50.2 |
| $F_3$ | 78° C./35 mm. Hg — 112° C./10 mm. Hg | 105.1 |
| In a trap (cooled at −70° C.) | | 18.5 |
| Residue of distillation | | 47.6 |

The main component of the fraction $F_2$ was N,N-dimethylformamide. The N,N-dimethylformamide content of the fraction $F_2$ was 91.2% (Yield in relation to the charged hydrogen cyanide: 24.9%).

The fractions $F_1$ and $F_3$, and a fraction in the trap were mixed. To the mixture were added 27 g. of hydrogen cyanide, 55 g. of methanol and 2 g. of zirconium oxychloride, whereupon, in the same manner as described above, the reaction was allowed to proceed and then the distillation was effected to give the following fractions.

TABLE 16

| Fraction | Boiling point | Yield, g. |
|---|---|---|
| $F'_1$ | 20 to 100° C./760 mm. Hg | 22.4 |
| $F'_2$ | 73 to 78° C./40 mm. Hg | 50.9 |
| $F'_3$ | 76° C./35 mm. Hg — 115° C./10 mm. Hg | 107.5 |
| In a trap (cooled at −70° C.) | | 20.5 |
| Residue of distillation | | 3.5 |

The main component of the fraction $F'_2$ was N,N-dimethylformamide. The N,N-dimethylformamide content of the fraction $F'_2$ was 94.1% (Yield in relation to the charged hydrogen cyanide: 65.6%).

The fractions $F'_1$ and $F'_3$, and a fraction in the trap were mixed. To the mixture were added 27 g. of hydrogen cyanide, 55 g. of methanol and 2 g. of cobalt chloride, whereupon, in the same manner as described above, the reaction was allowed to proceed and then the distillation was effected to give the following fractions.

TABLE 17

| Fraction | Boiling point | Yield, g. |
|---|---|---|
| $F''_1$ | 20 to 102° C./760 mm. Hg | 35.5 |
| $F''_2$ | 73 to 78° C./40 mm. Hg | 51.5 |
| $F''_3$ | 80° C./35 mm. Hg — 115° C./10 mm. Hg | 108.5 |
| In a trap (cooled at −70° C.) | | 24.1 |
| Residue of distillation | | 3.1 |

The main component of the fraction $F''_2$ was N,N-dimethylformamide. The N,N-dimethylformamide content of the fraction $F''_2$ was 88.2% (Yield in relation to the charged hydrogen cyanide: 62.3%).

The same recycling operation as described above was repeated further 8 times, resulting in the following fractions.

TABLE 18

| Boiling point | Yield, g. |
|---|---|
| Fractions: | |
| F'''₁ ........ 20 to 102° C./760 mm. Hg ........ | 142.5 |
| F'''₂ ........ 75 to 80° C./42 mm. Hg ........ | 51.8 |
| F'''₃ ........ { 80° C./35 mm. Hg / 111° C./10 mm. Hg } | 105.3 |
| In a trap (cooled at −70° C.) ........ | 20.1 |
| Residue of distillation ........ | 2.5 |

The main component of the fraction F'''₂ was N,N-dimethylformamide. The N,N-dimethylformamide of the fraction F'''₂ was 90.5% (Yield in relation to the charged hydrogen cyanide: 64.2%).

The results of the repeated recycling operations as conducted above are summarized in the following Table 19.

TABLE 19

| Number of recycling stage | Hydrogen cyanide charged, g. | By-products recycled, g. (F₁ plus F₂ plus trap) | Yield of N,N-dimethylformamide G. | Percent |
|---|---|---|---|---|
| 1 | 67.5 | 141.3 | 45.7 | 24.9 |
| 2 | 27 | 149.4 | 47.8 | 65.6 |
| 3 | 27 | 168.1 | 45.5 | 62.3 |
| 4 | 27 | 180.3 | 49.1 | 67.3 |
| 5 | 27 | 190.1 | 44.9 | 61.5 |
| 6 | 27 | 211.5 | 50.5 | 69.2 |
| 7 | 27 | 224.9 | 48.5 | 66.4 |
| 8 | 27 | 234.0 | 46.9 | 64.3 |
| 9 | 27 | 245.8 | 50.5 | 69.2 |
| 10 | 27 | 256.2 | 50.5 | 68.5 |
| | 27 | 267.9 | 46.9 | 64.2 |
| | ¹ 337.5 | ² 267.9 ³ | ³ 526.3 | ⁴ 57.7 |

¹ Total charge of hydrogen cyanide.
² Final by-product.
³ Total yield.
⁴ Average percent.

Whilst, the following comparative experiment was conducted. 337.5 g. of hydrogen cyanide, 697 g. of methanol and 45 g. of zirconium oxychloride were charged into an autoclave and heated at 250° C. for 1 hour to give N,N-dimethylformamide in a poor yield of 265.2 g. (28.7%).

EXAMPLE 21

27.0 g. (1.0 mole) of hydrogen cyanide, 64.0 g. (2.0 moles) of methanol and 8.0 g. of cupric chloride were charged into an autoclave having a capacity of 500 ml. and, after replacement of the air in the autoclave by nitrogen, were heated to react at 260° C. for 1 hour with stirring. On opening the autoclave, the reaction mixture was subjected to distillation to give the following fractions. (HCN was not detected in the reaction mixture.)

TABLE 20

| Boiling point | Yield, g. |
|---|---|
| Fraction: | |
| F₁ ........ Up to 98° C./760 mm. Hg ........ | 30.5 |
| F₂ ........ 98 to 101° C./760 mm. Hg ........ | 4.5 |
| F₃ ........ 74 to 79° C./40 mm. Hg ........ | 20.2 |
| F₄ ........ { 90° C./35 mm. Hg / 115° C./10 mm. Hg } | 21.0 |
| In a trap (cooled at −70° C.) ........ | 5.6 |
| Residue of distillation ........ | 23.6 |

The main component of the fraction F₃ was N,N-dimethylformamide and the N,N-dimethylformamide content of the fraction F₃ was 92.0% which means the yield of N,N-dimethylformamide was 18.6 g. (Yield in relation to the charged hydrogen cyanide: 25.5%.)

To 30.5 g. of the fraction F₁ shown in Table 1 were added 27.0 g. of hydrogen cyanide, 64.0 g. of methanol and 8.0 g. of cupric chloride, whereupon, in the same manner as described above, the reaction was allowed to proceed and then the distillation was effected to give 24.1 g. of N,N-dimethylformamide. (Yield in relation to the charged hydrogen cyanide: 33.0%.) The yield in relation to the charged hydrogen cyanide increased by 7.5%.

EXAMPLE 22

To 21.0 g. of the fraction F₄ shown in Table 20 of Example 21 were added 27.0 g. of hydrogen cyanide, 64.0 g. of methanol and 8.0 g. of cupric chloride, whereupon, in the same manner as mentioned in Example 21, the reaction was allowed to proceed and then the distillation was effected to give 42.5 g. of N,N-dimethylformamide (yield in relation to the charged hydrogen cyanide: 53.2%). The yield in relation to the charged hydrogen cyanide increased by 27.7%.

EXAMPLE 23

54.0 g. (2.0 moles) of hydrogen cyanide, 128.0 g. (4.0 moles) of methanol and 15.0 g. of zirconium oxychloride (total amount of charge: 197 g.) were charged into an autoclave having a capacity of 500 ml. and heated to react at 200° C. for 24 hours with stirring. On opening the autoclave, the reaction mixture was subjected to a distillation to give the following fractions. No hydrogen cyanide was detected in the reaction mixture which means that the hydrogen cyanide was completely consumed.

TABLE 21

| Boiling point | Yield, g. |
|---|---|
| Fraction: | |
| F₁ ........ Up to 98° C./760 mm. Hg ........ | 86.0 |
| F₂ ........ 98 to 100° C./760 mm. Hg ........ | 10.5 |
| F₃ ........ 74 to 79° C./40 mm. Hg ........ | 40.5 |
| F₄ ........ { 89° C./35 mm. Hg / 115° C./10 mm. Hg } | 56.0 |
| In a trap (cooled at −70° C.) ........ | 9.8 |
| Residue of distillation ........ | 16.2 |

The main component of the fraction F₃ was N,N-dimethylformamide. The analysis of the fraction F₃ showed that the yield of N,N-dimethylformamide was 32.1 g. (yield in relation to the charged hydrogen cyanide: 22.0%).

The fraction F₃ was mixed with the fractions F₁, F₂ and F₄ and the fraction in a trap (total amount: 112.3 g.). The mixture of the above-mentioned fractions was added to 54.0 g. (2.0 moles) of hydrogen cyanide, 128.0 g. (4.0 moles) of methanol and 15.0 g. of zirconium oxychloride in an autoclave (total amount of charge: 307.3 g.), whereupon, in the same manner as mentioned above, the reaction was allowed to proceed and then the distillation was effected to give 82.5 g. of N,N-dimethylformamide (yield in relation to the charged hydrogen cyanide: 56.5%). The recycling of the by-products increased the yield more than twice as much. Nothing but catalysts were found in the residue.

EXAMPLE 24

27.0 g. (1.0 mole) of hydrogen cyanide 64.0 g. (2.0 moles) of methanol and 10.0 g. of antimony chloride were charged into an autoclave having a capacity of 200 ml. and, after replacement of the air in the autoclave by nitrogen, were heated to react at 220° C. for 6 hours. The thus obtained reaction mixture was distilled to give fractions of the kinds as shown in Table 22. No hydrogen cyanide was detected in the reaction mixture which means that the hydrogen cyanide was completely consumed.

TABLE 22

| Boiling point | Yield, g. |
|---|---|
| Fraction: | |
| F₁ ........ Up to 98° C./760 mm. Hg ........ | 33.6 |
| F₂ ........ 98 to 101° C./760 mm. Hg ........ | 4.3 |
| F₃ ........ 72 to 78° C./40 mm. Hg ........ | 19.8 |
| F₄ ........ { 90° C./35 mm. Hg / 115° C./10 mm. Hg } | 25.0 |
| In a trap (cooled at −70° C.) ........ | 4.2 |
| Residue of istillation ........ | 8.7 |

The main component of the fraction $F_3$ was N,N-dimethylformamide. The N,N-dimethylformamide content of the fraction $F_3$ was 95.0% (yield in relation to the charged hydrogen cyanide: 25.9%).

The fractions $F_2$ and $F_4$ and the fraction in a trap were mixed (total amount: 33.5 g.).

To 2.7 g. (0.1 mole) of hydrogen cyanide, 3.4 g. of the above-mentioned by-product mixture and 1.5 g. of antimony chloride was added methanol in an amount as shown in Table 22, whereupon, reaction was allowed to proceed at 220° C. for 6 hours in an autoclave. The yields of the thus obtained N,N-dimethylformamide in relation to the charged hydrogen cyanide are summarized in Table 23.

TABLE 23

| Experiment number | Amount of methanol[1] | Yield (percent) |
|---|---|---|
| 1 | 1.0 | 25.8 |
| 2 | 1.5 | 43.6 |
| 3 | 2.0 | 67.7 |
| 4 | 4.0 | 59.0 |
| 5 | 10.0 | 40.2 |
| 6 | 20.0 | 19.3 |

[1] Expressed in mole in relation to the amount of hydrogen cyanide.

EXAMPLE 25

In the same manner as described in Example 21, 27.0 g. (1.0 mole) of hydrogen cyanide, 64.0 g. (2.0 moles) of methanol and a catalyst as shown in Table 24 in an amount of 5 mole percent in relation to the hydrogen cyanide and heated to react at 230° C. for 3 hours. The thus obtained reaction mixture was subjected to distillation to give N,N-dimethylformamide with the yields as shown in Table 24. The fractions having the boiling points as shown in Table 20 of Example 21 were obtained as by-products. The fractions corresponding to the fractions $F_1$, $F_2$ and $F_4$ and the fraction in a trap of Table 20 were mixed. To the resulting mixture were added 27.0 g. of hydrogen cyanide, 64.0 g. of methanol and a catalyst as shown in Table 24 in an amount of 5 mole percent in relation to the hydrogen cyanide, whereupon, in the same manner as mentioned above, the reaction was allowed to proceed to give N,N-dimethylformamide with the yields as shown in Table 24.

TABLE 24

| Catalyst | First reaction | Second reaction (after recycling) |
|---|---|---|
| Cuprous chloride | 22.2 | 48.0 |
| Cupric thiocyanate | 23.1 | 45.5 |
| Silver nitrate | 15.2 | 41.2 |
| Chloroplatinic acid | 13.3 | 35.7 |
| Titanium dioxide | 14.2 | 46.0 |
| Zirconium oxychloride | 24.7 | 57.0 |
| Stannous nitrite | 25.2 | 44.8 |
| Stannic nitrite | 23.6 | 45.1 |
| Lead phosphate | 21.3 | 42.2 |
| Antimony chloride | 24.1 | 34.1 |
| Bismuth chloride | 23.0 | 37.0 |
| Chromium chloride | 21.0 | 38.5 |
| Molybdic acid | 14.0 | 29.5 |
| Tungstic acid | 17.1 | 30.2 |
| Manganese chloride | 24.5 | 48.0 |
| Ferric chloride | 27.2 | 41.5 |
| Cobalt chloride | 26.3 | 49.0 |
| Nickel chloride | 21.1 | 48.1 |
| Rhodium chloride | 16.0 | 37.2 |
| Palladium chloride | 13.5 | 40.6 |
| Iridium chloride | 18.2 | 41.1 |
| Platinum chloride | 17.3 | 35.0 |
| Manganese naphthenate | 22.5 | 42.5 |
| Cupric sulfite | 22.0 | 42.1 |
| Cupric phosphite | 21.0 | 45.6 |
| Zinc phosphate | 20.2 | 36.2 |
| Zinc phosphite | 24.3 | 30.1 |
| Zinc cyanate | 23.2 | 37.2 |
| Zinc borate | 20.7 | 38.7 |
| Zinc formate | 18.0 | 35.1 |
| Zinc oxalate | 24.4 | 40.2 |
| Stannic naphthenate | 26.0 | 44.5 |
| Stannic borate | 21.9 | 49.2 |
| Stannic thiocyanate | 23.0 | 47.3 |
| Stannous propionate | 26.4 | 46.2 |
| Stannous stearate | 27.8 | 51.6 |
| Stannous p-toluenesulfonate | 28.3 | 49.7 |

TABLE 24—Continued

| Catalyst | First reaction | Second reaction (after recycling) |
|---|---|---|
| Cobalt naphthenate | 23.1 | 47.4 |
| Antimony oxychloride | 19.8 | 38.8 |
| Antimony pentoxide | 21.8 | 47.5 |
| Cobalt butyrate | 22.0 | 41.7 |
| Lead nitrate | 21.5 | 45.8 |
| Copper (powder) | 10.1 | 32.1 |
| Cupric carbonate | 19.2 | 34.2 |
| Zinc | 6.2 | 30.1 |
| Cadmium | 3.5 | 32.1 |
| Mercury | 3.0 | 29.3 |
| Nickel phosphate | 24.2 | 40.4 |
| Nickel thiocyanate | 28.7 | 44.0 |
| Rhodium nitrate | 21.8 | 32.0 |
| Rhodium sulfate | 19.7 | 33.5 |
| Palladium nitrate | 16.0 | 34.8 |
| Palladium sulfate | 18.0 | 37.0 |
| Platinic iodide | 18.3 | 31.0 |
| Platinic nitrate | 20.4 | 30.6 |
| Platinous cyanide | 20.9 | 32.4 |
| Bismuth nitrate | 26.2 | 38.8 |
| Cadmium carbonate | 18.6 | 37.1 |
| Cadmium hydroxide | 19.9 | 36.5 |
| Titanium trichloride | 22.1 | 55.2 |
| Titanium tetrachloride | 20.5 | 60.5 |
| Titanium hydroxide | 17.3 | 58.2 |
| Titanium sulfate | 16.2 | 52.8 |
| Titanium oxalate | 20.1 | 56.3 |
| Cobalt hydroxide | 19.3 | 37.8 |
| Cobalt carbonate | 22.3 | 35.2 |
| Cobalt cyanide | 26.5 | 46.5 |
| Cobalt borate | 21.3 | 42.0 |
| Cobalt formate | 24.2 | 51.2 |
| Cobalt oxalate | 24.0 | 48.4 |
| Cobalt benzoate | 21.7 | 44.9 |
| Ferric oxide | 21.1 | 35.8 |
| Ferric cyanide | 27.8 | 37.0 |
| Ferrous nitrate | 25.6 | 39.0 |
| Ferric nitrate | 29.2 | 40.0 |
| Ferrous sulfate | 28.3 | 35.8 |
| Ferric acetate | 26.4 | 42.0 |
| Nickel sulfate | 22.4 | 45.7 |
| Nickel hydroxide | 20.3 | 39.5 |
| Nickel oxalate | 24.2 | 41.8 |

EXAMPLE 26

In the same manner as described in Example 21, 27.0 g. (1.0 mole) of hydrogen cyanide, 60.0 g. (2.0 moles) of methanol and a mixed catalyst as shown in Table 25 were charged in an autoclave and heated to react at 190° C. for 40 hours. The reaction mixture was subjected to distillation to give fractions $F_1$, $F_2$ and $F_4$ and a fraction in a trap in addition to a fraction containing N,N-dimethylformamide. The yields of the thus obtained N,N-dimethylformamide are summarized in Table 25. The fractions $F_1$, $F_2$ and $F_4$ and the fraction in a trap were mixed. To the resulting by-product mixture were added 27.0 g. of hydrogen cyanide, 60.0 g. of methanol and a catalyst as mentioned above, whereupon, in the same manner as described above, the reaction was allowed to proceed and then the distillation was effected to give N,N-dimethylformamide with the yields as shown in Table 25.

TABLE 25

| Catalyst | Amount of catalyst | First reaction | Second reaction (after recycling) |
|---|---|---|---|
| Cadmium acetate | 1.5 | 15.2 | 40.2 |
| Mercuric acetate | 1.5 | | |
| Cadmium benzoate | 2.0 | 25.3 | 42.3 |
| Vanadium pentoxide | 1.0 | | |
| Mercuric formate | 2.0 | 18.2 | 32.6 |
| Zirconium oxide | 1.0 | | |
| Bismuth oxychloride | 1.0 | | |
| Cadmium propionate | 2.5 | 16.7 | 34.6 |
| Manganese sulfite | 2.5 | | |
| Silver sulfite | 1.0 | | |
| Mercurous stearate | 1.0 | | |
| Manganese borate | 1.0 | 21.3 | 42.3 |
| Molybdenum trioxide | 1.0 | | |
| Tungsten hexachloride | 1.0 | | |
| Mercuric benzoate | 1.5 | | |
| Zirconium sulfate | 1.0 | 12.5 | 32.5 |
| Vanadium oxychloride | 1.5 | | |
| Chromium carbonate (basic) | 1.0 | | |
| Chromium naphthenate | 1.0 | | |
| Bismuth oxalate | 1.0 | 22.3 | 42.1 |
| Chromium formate | 1.0 | | |
| Silver cyanide | 1.0 | | |

EXAMPLE 27

In the same manner as described in Example 21, 27.0 g. (1.0 mole) of hydrogen cyanide, 64.0 g. (2.0 moles) of methanol and 14.5 g. of titanium hydroxide were charged in an autoclave and heated to react at 240° C. for 1 hour. The thus obtained reaction mixture was subjected to distillation to give 45.0 g. of fractions $F_1$, $F_2$ and $F_4$ and a fraction in a trap having the boiling points as shown in Table 20. To 20.0 g. of the mixture of the fractions $F_1$, $F_2$ and $F_4$ and the fraction in the trap were added 13.5 g. of hydrogen cyanide, 32.0 g. of methanol and 7.5 g. of titanium hydroxide, whereupon the reaction was allowed to proceed at 100° C. for 10 days to give 4.2 g. of N,N-dimethylformamide (yield in relation to the charged hydrogen cyanide: 11.5%).

EXAMPLE 28

27.0 g. of hydrogen cyanide, 148.0 g. of n-butyl alcohol and 6.5 g. of manganese p-toluenesulfonate were charged into an autoclave and heated to react at 260° C. for 4 hours. The thus obtained reaction mixture was subjected to distillation to give 21.6 g. of N,N-di-n-butyl-formamide. To 140 g. of the by-products obtained in the reaction and having boiling points higher and lower than N,N-di-n-butylformamide were added 27.0 g. of hydrogen cyanide, 148 g. of n-butyl alcohol and 6.5 g. of manganese p-toluene-sulfonate in an autoclave, whereupon the reaction was allowed to proceed at 260° C. for 1 hour and then the distillation was effected to give 62.5 g. of N,N-di-n-butylformamide.

What is claimed is:

1. A process for the preparation of N,N-dialkyl-substituted fatty amides represented by the general formula

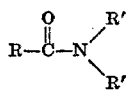

wherein R is an alkyl radical having 1 to 6 carbon atoms and R' is an alkyl radical having 1 to 4 carbon atoms, which comprises reacting, at a temperature in the range of 100° to 500° C., under pressure, a nitrile represented by the general formula R—CN, wherein R has the same meaning as defined above, with alcohol selected from the group consisting of methyl alcohol, ethyl alcohol, n-propyl alcohol, isopropyl alcohol, n-butyl alcohol and isobutyl alcohol, the alcohol being employed in an amount in the range of from 1.5 to 10 moles per mole of the nitrile, in the presence of from 0.0001 to 10 mole percent, based on the amount of the nitrile, of a catalyst selected from the three groups respectively consisting of (1) the metals copper, cadmium, mercury and tin; (2) oxides, oxyhalides, hydroxides, inorganic acid salts and organic acid salts of a metal selected from the group consisting of copper, silver, cadmium, mercury, titanium, zirconium, tin, lead, vanadium, antimony, bismuth, chromium, molybdenum, tungsten, manganese, cobalt, nickel, rhodium, palladium and platinum; and (3) chromic acid, bichromic acid, molybdic acid, phosphomolybdic acid, tungstic acid and permanganic acid; alkali metal salts thereof, and separating the N,N-dialkyl-substituted fatty amide from the reaction mixture and recycling at least a part of the by-products of the reaction to the starting reaction mixture.

2. The process in accordance with claim 1 which comprises reacting said nitrile with said alcohol in an autoclave to obtain a first reaction mixture comprising said N,N-dialkyl-substituted fatty amide, separating said N,N-dialkyl-substituted fatty amide from said mixture by distillation to obtain a first balance of reaction mixture, adding fresh nitrile, alcohol and catalyst to at least a portion of said first balance of reaction mixture, reacting the latter mixture to obtain a second reaction mixture comprising N,N-dialkyl-substituted fatty amide, separating the latter by distillation to obtain a second balance of reaction mixture, and repeating the steps of obtaining additional reaction mixtures and separating N,N-dialkyl-substituted fatty amide therefrom.

3. A process as claimed in claim 1, wherein said catalyst is selected from the group consisting of the halides of copper, cadmium, titanium, tin, lead, antimony, bismuth, chromium, manganese, cobalt, nickel and palladium.

4. A process for the preparation of N,N-dialkylformamides represented by the general formula

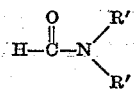

wherein R' is an alkyl radical having 1 to 4 carbon atoms, which comprises reacting, at a temperature in the range of 100° to 500° C. under pressure, hydrogen cyanide with alcohol selected from the group consisting of methyl alcohol, ethyl alcohol, n-propyl alcohol, isopropyl alcohol, n-butyl alcohol and isobutyl alcohol, the alcohol being employed in an amount in the range of from 1.5 to 10 moles per mole of the hydrogen cyanide, in the presence of from 0.0001 to 10 mole percent, based on the amount of the nitrile, of a catalyst selected from the three groups respectively consisting of (1) the metals copper, cadmium, mercury and tin; (2) oxides, oxyhalides, hydroxides, inorganic acid salts and organic acid salts of a metal selected from the group consisting of copper, silver, cadmium, mercury, titanium, zirconium, tin, lead, vanadium, antimony, bismuth, chromium, molybdenum, tungsten, manganese, cobalt, nickel, rhodium, palladium and platinum; and (3) chromic acid, bichromic acid, molybdic acid, phosphomolybdic acid, tungstic acid and permanganic acid; alkali metal salts thereof.

5. The process in accordance with claim 4 which comprises reacting hydrogen cyanide with said alcohol in an autoclave to obtain a first reaction mixture comprising N,N-dialkyl-formamide, separating said N,N-dialkyl-formamide from said mixture by distillation to obtain a first balance of reaction mixture, adding fresh hydrogen cyanide, alcohol and catalyst to at least a portion of said first balance of reaction mixture, reacting the latter mixture to obtain a second reaction mixture comprising N,N-dialkyl-formamide, separating the latter by distillation to obtain a second balance of reaction mixture, and repeating the steps of obtaining additional reaction mixtures and separating N,N-dialkyl-formamide therefrom.

6. A process as claimed in claim 4, wherein said catalyst is selected from the group consisting of the halides of copper, cadmium, titanium, tin, lead, antimony, bismuth, chromium, manganese, cobalt, nickel and palladium.

7. A process as claimed in claim 4, wherein at least a part of the by-products of the reaction is recycled to the starting reaction mixture.

8. The process in accordance with claim 1, in which the by-products recycled to the starting reaction mixture include all those which distill off from the reaction mixture at higher temperatures and lower pressures than the produced N,N-dialkyl-substituted fatty amides.

9. The process in accordance with claim 7, in which the by-products recycled to the starting reaction mixture include all those which distill off from the reaction mixture at higher temperatures and lower pressures than the produced N,N-dialkyl-formamides.

References Cited

UNITED STATES PATENTS

| | | | |
|---|---|---|---|
| 2,601,387 | 6/1952 | Gresham et al. | 260—561 R |
| 3,674,851 | 7/1972 | Senoo et al. | 260—561 R |

FOREIGN PATENTS

| | | | |
|---|---|---|---|
| 1,009,614 | 6/1957 | Germany | 260—561 R |
| 2,015,840 | 10/1970 | Germany | 260—561 R |

OTHER REFERENCES

Hamamoto et al., C.A. 55: 4349d (1961).

LEWIS GOTTS, Primary Examiner

E. G. LOVE, Assistant Examiner

UNITED STATES PATENT OFFICE
CERTIFICATE OF CORRECTION

Patent No. 3,751,465          Dated August 7, 1973

Inventor(s) Yasunobu Takahashi, Yohei Fukuoka, Katuyoshi Sasaki and Saburo Senoo It is certified that error appears in the above-identified patent and that said Letters Patent are hereby corrected as shown below:

Col. 1, line 8; change "Kassi" to ---Kasei---.

Col. 1; Insert priority data as follows:

---Japan    Aug. 15, 1967, 42-52083 and
    Japan    Nov. 16, 1967, 42-73363 ---.

Col. 19, line 53; change "alcohol, ethyl alcohol," to

---alcohol,---.

Signed and sealed this 12th day of February 1974.

(SEAL)
Attest;

EDWARD M. FLETCHER, JR.    C. MARSHALL DANN
Attesting Officer    Commissioner of Patents